(12) United States Patent
Kubo

(10) Patent No.: US 6,985,252 B1
(45) Date of Patent: Jan. 10, 2006

(54) COLOR IMAGE PROCESSING METHOD AND A COLOR IMAGE PROCESSOR

(75) Inventor: Masahiko Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 879 days.

(21) Appl. No.: 09/721,944

(22) Filed: Nov. 27, 2000

(30) Foreign Application Priority Data

Dec. 14, 1999 (JP) ............................... 11-353936

(51) Int. Cl.
*G06K 9/00* (2006.01)
*G03F 3/08* (2006.01)
*H04N 1/40* (2006.01)
*G09G 5/02* (2006.01)

(52) U.S. Cl. .................... 358/1.9; 358/518; 358/3.23; 382/162; 345/589

(58) Field of Classification Search ................. 358/1.9, 358/2.1, 3.23, 518, 520, 515, 500, 523, 504; 382/163, 165, 167; 345/589, 601, 590
See application file for complete search history.

(56) References Cited

U.S. PATENT DOCUMENTS

| | | | | |
|---|---|---|---|---|
| 4,926,254 A | * | 5/1990 | Nakatsuka et al. | 358/527 |
| 5,315,381 A | * | 5/1994 | Yamashita et al. | 358/500 |
| 5,331,440 A | * | 7/1994 | Kita et al. | 358/529 |
| 5,528,377 A | * | 6/1996 | Hutcheson | 358/1.9 |
| 5,636,290 A | * | 6/1997 | Kita et al. | 382/167 |
| 5,719,956 A | * | 2/1998 | Ogatsu et al. | 382/167 |
| 5,724,442 A | * | 3/1998 | Ogatsu et al. | 382/167 |
| 6,014,457 A | * | 1/2000 | Kubo et al. | 382/167 |
| 6,499,829 B1 | * | 12/2002 | Tabata et al. | 347/43 |
| 6,556,312 B1 | * | 4/2003 | Nagatani | 358/1.9 |

FOREIGN PATENT DOCUMENTS

| | | |
|---|---|---|
| JP | 7-87347 | 3/1995 |
| JP | 8-65534 | 3/1996 |
| JP | 8-116456 | 5/1996 |
| JP | 8-204973 | 8/1996 |
| JP | 9-186894 | 7/1997 |

* cited by examiner

*Primary Examiner*—Kimberly Williams
*Assistant Examiner*—Charlotte M. Baker
(74) *Attorney, Agent, or Firm*—Morgan, Lewis & Bockius LLP

(57) ABSTRACT

The invention comprises a device-independent color space converter 241 that obtains device-dependent color signals on the on the color system color coordinates from first color signals, a gradation compensator 242 that determines a black color signal in the second color signals having the identical or virtually identical density as the black color signal in the first color signals, and a YMC decision section 243 that determines the remaining three variable color signals in the second color signals from the black color signal and the device-independent color signals in the second color signals so that calorimetric consistency of the three variable color signals may be obtained.

16 Claims, 9 Drawing Sheets

Fig. 5 Comparison of color conversion accuracy between the present invention and related art

Fig. 7

Step1
A color patch is printed out corresponding to an arbitrary combination of printing color signals Y, M, C and K and the colorimetric values color signals Y, M, C and K are measured.

Step2
Neural Network 1 is instructed to study a data set of Y, M, C and K and L*a*b* as instructor data.

Step3
A color patch corresponding to an arbitrary combination of image recording signals Y', M', C' and K' for the image output apparatus 300 is printed out and the colorimetric values L*'a*'b*' are measured.

Step4
Neural Network 2 is instructed to study a data set of Y', M', C' and K' and L*'a*'b*' as instructor data.

Step5
Colorimetric values L*a*b* for the input address values Y, M, C and K of the four-dimensional DLUT color converter are determined by using Neural Network 1.

Step6
Black addition amount K' for the image output apparatus that has an equivalent lightness to that of the input address value K of the four-dimensional DLUT color converter is determined by using the one-dimensional lookup table.

Step7
By solving Neural Network 2 by using the numerical solution from the colorimetric values L*a*b* and the black addition amount K', colorimetrically consistent values Y', M' and C' are calculated.

Step8
When the input address values Y, M and C of the four-dimensional DLUT color converter are all zero, calculated values Y', M' and C' are all corrected to be zero.

Step9
Obtained Y', M' and C' and black addition amount K' are set to lattice points of the four-dimensional DLUT color converter.

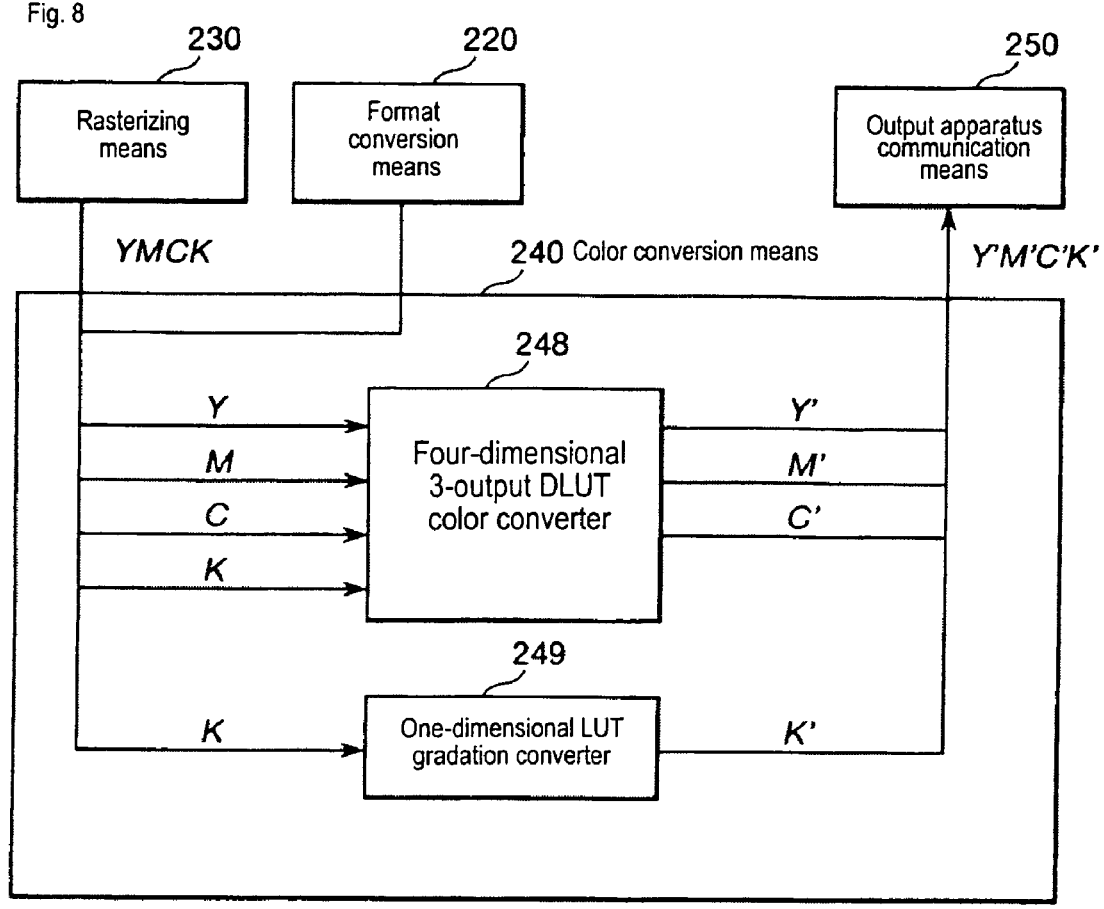

Fig. 9

Step 1'
A color patch is printed out corresponding to an arbitrary combination of printing color signals Y, M, C and K and the colorimetric values color signals Y, M, C and K are measured.

Step 2'
Neural Network 1 is instructed to study a data set of Y, M, C and K and L*a*b* as instructor data.

Step 3'
A color patch corresponding to an arbitrary combination of image recording signals Y', M', C' and K' for the image output apparatus 300 is printed out and the colorimetric values L*'a*'b*' are measured.

Step 4'
Neural Network 2 is instructed to study a data set of Y', M', C' and K' and L*'a*'b*' as instructor data.

Step 5'
Colorimetric values L*a*b* for the input address values Y, M, C and K of the four-dimensional DLUT color converter are determined by using Neural Network 1.

Step 6'
Black addition amount K' for the image output apparatus that has an equivalent lightness to that of the input address value K of the four-dimensional DLUT color converter is determined by using the one-dimensional lookup table.

Step 7'
By solving Neural Network 2 by using the numerical solution from the colorimetric values L*a*b* and the black addition amount K', colorimetrically consistent values Y', M' and C' are calculated.

Step 8'
When the input address values Y, M and C of the 4-input 3 output DLUT color converter are all zero, calculated values Y', M' and C' are all corrected to be zero.

Step 9'
Obtained Y', M' and C' and black addition amount K' are set to lattice points of the four-dimensional DLUT color converter.

COLOR IMAGE PROCESSING METHOD AND A COLOR IMAGE PROCESSOR

BACKGROUND OF THE INVENTION

The present invention relates to a color image processing method and a color image processor for converting an input color image signal to a color image recording signal. More particularly, the present invention relates to a color image processing method and a color image processor for converting four or more input color image signals including black to four color image recording signals including black.

With the advancement of computer technologies, network technologies and color printer technologies in recent years, the desktop publishing (hereinafter referred to as the DTP) is getting more and more popular. In the DTP process, printed matters conventionally ordered from a print shop is available by preparing electronic print manuscript via a computer in an office or home and outputting the manuscript via a color printer owned by the office or home in the case of a small number of copies, and sending the electronic manuscript to the print shop in the case of a large number of copied.

In the case of the DTP, since the target output apparatus is printing apparatus, it is a common practice to create electronic print data by using so-called color signals Y, M, C and K associated with yellow, magenta, cyan and black. A color printer of the electrophotography method or ink-jet method used for the DTP, it is possible to output images by using the same yellow, magenta, cyan and black as on printed matters.

However, since the image forming method differs between printing and a color printer, the same color materials as in printing may not be available for ink or toner. Even when the same color materials are used for ink or toner, the structure of image or screen image is different thus resulting in a considerable difference in color reproducibility. As a result, the same colors cannot be obtained even if the same signals as the four color signals Y, M, C and K are output on a color printer, the same colors are not obtained.

Thus, a color printer for DTP mounts color conversion apparatus that converts input color signals Y, M, C and K for printing to color signals Y, M, C and K for color printers in order to output colors identical with those for printing on color printers. Such color conversion apparatus generally uses matrix operation, Neural Network, and the direct lookup table (hereinafter referred to as the DLUT).

Here, the matrix operation describes the relationship between input values and output values in the primary or higher determinant and stores the coefficient of the determinant in the ROM (read only memory) or RAM (random access memory) in advance. This approach has advantages that only a small number of parameters are required for color conversion and that the necessary free space of ROM or RAM is very small. The matrix operation, however, has a disadvantage that it is difficult to obtain a high color consistency accuracy between input and output for input/output characteristics with high non-linearity.

The Neural Network is a description of relationship between input values and output values in the form of the Neural Network. This approach has advantages that only a small number of parameters are required for color conversion and that it is possible to obtain a high color consistency accuracy between input and output for input/output characteristics with high non-linearity. The Neural Network, however, has a disadvantage that it is not suited for real-time processing because of a large amount of operation.

The direct lookup table is a table stored in the ROM or RAM in advance that represents the relationship between input values and output values, the input values obtained by a predetermined color conversion coefficient. The direct lookup table has an advantage that color conversion is made at a very high speed, since this approach virtually requires no operation time. The direct lookup table has another advantage that it is possible to obtain a high color consistency accuracy between input and output for input/output characteristics with high non-linearity, since a desired input/output relationship can be specified as a principle.

The DTP assumes output as printed matters so that color signals specified as colors used for electronic manuscript are typically so-called color signals Y, M, C and K associated with yellow, magenta, cyan and black.

In recent years, there exists a printing technology using five inks or more called HiFi color aiming at upgrading of picture quality via expansion of color reproducibility. In this technology, six color signals including additional colors, orange and green, are used to represent an electronic manuscript. Whichever color signals are used, black is specified by the editor that prepares the electronic manuscript from respective points of view for text, figures and natural pictures.

In particular, text and figures are specified in a single black color for visibility of black text and black thin lines irrespective of the density of the text and the thin lines. Gray representation of figures is either made in the process black composed of yellow, magenta and cyan, or a single black color, depending on the representation intention of the editor.

Meanwhile, in natural pictures, photo retouching software or scanner is used to generate the black color by carrying out black addition typically called UCR (under color removal) or GCR (gray component replacement). It is a common practice to skip black addition in an area with lower density and carry out black addition only in an area with higher density, in order to assure graininess and gradation. Since a larger black addition amount worsens the color reproducibility, the black addition ratio is typically set to as low as around 50 percent in natural pictures.

As mentioned earlier, specification of black is different in figures and natural pictures, the same black addition amount is attained both for input and output as intended by the editor in the case of a printed output. Further, areas specified in a single black color is requested to be output in a single black color.

Meanwhile, for color conversion apparatus for DTP, the color conversion method for converting the color signals Y, M, C and K for printing to the color signals Y, M, C and K for color printers is roughly divided into three methods described below.

The first method converts color signals Y, M, C and K for printing to device-independent color signals such as the L*a*b* color signals and then converts the L*a*b* color signals to color signals Y, M, C and K for color printers. The second method splits four color signals Y, M, C and K into three color signals Y, M and C and a color signal K and performs color conversion on three colors Y, M and C so that calorimetric consistency may be obtained between input and output and performs color conversion on the color signal K so that density may be consistent between input and output. The third method converts four color signals Y, M, C and K for printing to the device-independent color signals and the black addition ratio and converts the device-independent color signals and the black addition ratio to four color signals Y, M, C and K for color printers.

The following methods have been proposed that convert color signals Y, M, C and K for printing to device-independent color signals and then convert the device-independent color signals to color signals Y, M, C and K for color printers. For example, in the Japanese Patent Laid-Open No. 87343/1995, the first Neural Network is used to convert four color signals Y, M, C and K to the L*a*b* color signals as three variable color signals in the device-independent uniform color space, then the second Neural Network is used to convert the L*a*b* color signals to four color signals Y, M, C and K including black.

In the Japanese Patent Laid-Open No. 204973/1996, the first color converter is configured via the Neural Network to convert four color signals Y, M, C and K to the L*a*b* color signals as three variable color signals in the device-independent uniform color space, then the second color conversion operation is configured via the direct lookup table to convert the L*a*b* color signals to four color signals Y, M, C and K including black.

Currently, the color management system (hereinafter referred to as CMS) based on the specifications proposed by the International Color Consortium (hereinafter referred to as ICC) widely spread as an industry standard basically uses this method to perform color conversion. Examples of representative CMS are Color Sync installed in the MacOS from Apple Corp. or ICM installed in Windows from the Microsoft Corp.

The following is an exemplary method that splits four color signals Y, M, C and K into three color signals Y, M and C and a color signal K and performs color conversion on three colors Y, M and C so that calorimetric consistency may be obtained between input and output and performs color conversion on the color signal K so that density of the color signal K may be consistent between input and output.

For example, in the Japanese Patent Laid-Open No. 65534/1996, the three colors Y, M and C out of the four color signals Y, M, C and K are converted to three color signals Y, M and C that are color-compensated by a higher determinant and the signal K is converted to the signal K that is gradation-compensated by the one-dimensional lookup table (hereinafter referred to as LUT).

In the Japanese Patent Laid-Open No. 116456/1996, three colors Y, M and C out of the four color signals Y, M, C and K are converted to three color signals Y, M and C that are color-compensated by the three-dimensional direct lookup table and the signal K is converted to the signal K that is gradation-compensated by the one-dimensional lookup table.

The following is an exemplary method that converts four color signals Y, M, C and K for printing to the device-independent color signals and the black addition ratio and converts the device-independent color signals and the black addition ratio to four color signals Y, M, C and K for color printers.

For example, in the Japanese Patent Laid-Open No. 186894/1997, four color signals Y, M, C and K are converted to the L*a*b* color signals as device-independent three variable color signals and the black addition ratio via first conversion means and converts the L*a*b* color signals and the black addition ratio to four color signals Y, M, C and K.

The method that converts color signals Y, M, C and K for printing to L*a*b* color signals as device-independent color signals and converts the L*a*b* color signals to color signals Y, M, C and K for color printers, proposed in the Japanese Patent Laid-Open No. 87343/1995 and Japanese Patent Laid-Open No. 204973/1996, is effective in that calorimetric consistency may be obtained between input and output. However, since the output black amount is determined irrespective of the input black amount, this method has a problem that the input black amount is inconsistent between input and output.

Moreover, since color characteristics of black color for printing or color printer differ with difference of color materials and image structure, there arises an essential problem that output of black text or black thin lines with a black addition ratio of 100 percent results in colorimetrically consistent gray of the four color signals Y, M, C and K, not in reproduction in a single black color. When three colors Y, M and C are added to black text or black thin lines to be reproduced in a single black color, the text or the thin lines are colored in the presence of wear of color or poor transfer thus worsening the picture quality.

When the black addition ratio is set to 100 percent focusing on reproduction of black text or black thin lines, the black addition amount is too large in natural pictures thus worsening graininess, gradation and color reproducibility.

The method that splits four color signals Y, M, C and K into three color signals Y, M and C and a color signal K and performs color conversion on three colors Y, M and C so that calorimetric consistency may be obtained between input and output and performs color conversion on the color signal K so that the density of the color signal K may be consistent between input and output, proposed in the Japanese Patent Laid-Open No. 65534/1996 and Japanese Patent Laid-Open No. 116456/1996, can obtain the consistency of the black addition amount between input and output thus reproducing black text and black thin lines specified in a single black color in a manuscript.

The method is effective in that colorimetric consistency of three colors Y, M and C is obtained. However, color reproducibility of color printers has a poor non-linearity and a very poor non-linearity in case black color is added. Thus, it is difficult to obtain calorimetric consistency of colors represented in four color signals Y, M, C and K even when consistency is obtained for colorimetric values of three colors Y, M and C and the density of the color K, respectively. In particular, when matrix operation is used in color converter as mentioned in the Japanese Patent Laid-Open No. 65534/1996, it is difficult to obtain a high color consistency between printing and color printers even when a higher determinant is used.

The method that converts four color signals Y, M, C and K for printing to device-independent color signals and the black addition ratio and converts the device-independent color signals and the black addition ratio to four color signals Y, M, C and K for color printers, proposed in the Japanese Patent Laid-Open No. 186894/1997, is effective in that calorimetric consistency of colors is obtained between input and output and consistency of black addition ratio is obtained between input and output.

However, since color characteristics of four color signals Y, M, C and K including black color for printing or color printer differ with difference of color materials and image structure, black addition amount is not perfectly consistent between input and output, even when the black addition ratio is made consistent. Further, same as the method proposed in the Japanese Patent Laid-Open No. 87347/1995 or the Japanese Patent Laid-Open No. 204973/1996, thee is a problem that black text and black thin lines specified in a single black color in a manuscript is represented in the process black composed of four colors Y, M, C and K that are calorimetrically consistent.

SUMMARY OF THE INVENTION

The invention is intended to eliminate the foregoing disadvantages of the related art. The invention aims at providing a color image processing method and a color image processor that can match the black addition amount for printing as an input with the black addition amount for color printers as an output, reproduce in a single black color text and figures are specified in a single black color in an manuscript, and match colorimetric colors between input and output.

The invention is a color image processing method and a color image processor to attain the foregoing object. A color image processing method according to the invention is intended to convert first color signals containing four or more variables including black to second color signals containing four variables including black and comprises a step for obtaining device-independent color signals on color system color coordinates, a step for determining a black color signal in the second color signals having the identical or virtually identical density as the black color signal in the first color signals, and a step for determining the remaining three variable color signals in the second color signals from the black color signal and the device-independent color signals in the second color signals so that calorimetric consistency of the three variable color signals may be obtained.

Color image processing apparatus according to the invention is intended to convert first color signals containing four or more variables including black to second color signals containing four variables including black and comprises means for obtaining device-independent color signals on color system color coordinates, means for determining the black color signal in the second color signals having the identical or virtually identical density to that of the black color signal in the first color signals, and means for determining the remaining three variable color signals in the second color signals from the black color signal and the device-independent color signals in the second color signals so that calorimetric consistency of the three variable color signals may be obtained.

In the invention, device-independent color signals on color system color coordinates are obtained from the first color signals containing four or more variable color signals including black and the black color signal in the second color signals having the identical or virtually identical density to that of the black color signal in the first color signals is determined. From the determined black color signal in the second color signals and the previously obtained device-independent color signals, the remaining three variable color signals in the second color signals are determined so that colorimetric consistency of the three variable color signals may be obtained. As a result, density of the black color signal can be made consistent between the first color signals and the second color signals, and colorimetric consistency of the three variables other than the black color may be obtained.

BRIEF DESCRIPTION OF THE DRAWINGS

FIG. 7 shows the steps for determining color conversion parameters.

FIG. 8 is a block diagram that shows the main sections of the third embodiment.

FIG. 9 shows the steps for determining color conversion parameters.

DETAILED DESCRIPTION OF THE PREFERRED EMBODIMENTS

Figure 1:
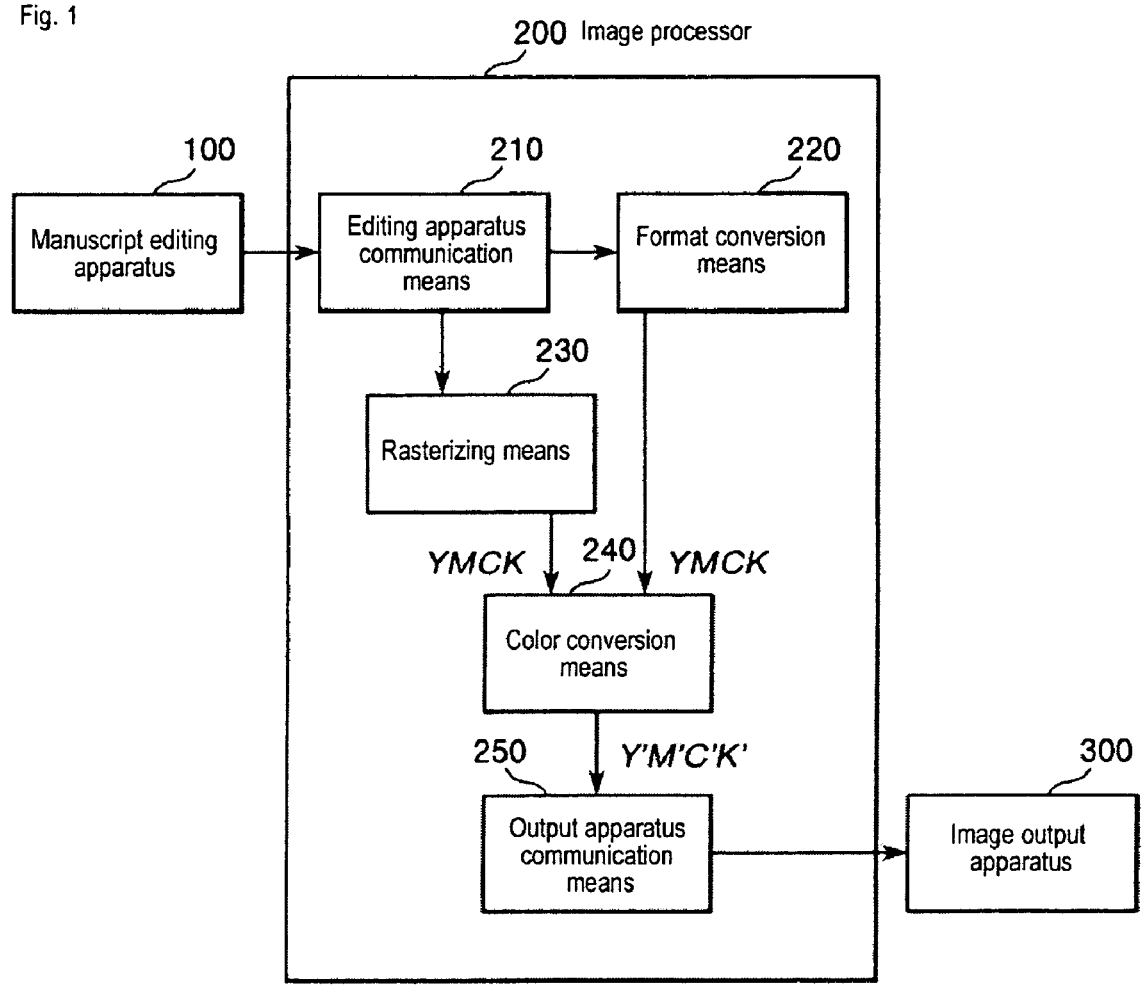
FIG. 1 is a block diagram of a color DTP system that uses a color image processor according to the invention.

Embodiments of a color image processing method and a color image processor according to the invention will be explained below with reference to figures. FIG. 1 is a block diagram of the color DTP system that uses color image processor according to the invention. The entire color DTP system is composed of manuscript editing apparatus 100, image processor 200 and image output apparatus 300.

The manuscript editing apparatus 100 is apparatus that prepares electronic printing manuscripts and outputs electronic manuscript data including a page description language and raster image data onto the image processor 200. In particular, the manuscript editing apparatus 100 either edits manuscripts by using a variety of applications on a personal computer (PC), or edits manuscripts on a dedicated computer.

When the manuscript editing apparatus 100 edits manuscripts on a PC, it edits electronic manuscripts by using DTP software such as the PagemakerPro from Adobe Systems and QuarkXPress from Quark Company on a Macintosh or IPM-PC. Prepared electronic manuscripts are converted for example by the PostScript printer driver from the Adobe Systems to PostScript as a page description language then output to the image processor 200 via a network such as the Ethernet.

While PostScript is used as a page description language to be sent from a PC for DTP to the image processor 200, any other page description language can be used.

When the manuscript editing apparatus 100 uses a dedicated computer, it edits electronic manuscripts via a dedicated workstation and application called the Color Electronic Prepress System (hereinafter referred to as CEPS) Prepared electronic manuscripts are output to the image processor 200 via a network such as the Ethernet, in the raster information format, for example, in the TIFF/IT format as standard specifications for raster image data or Scitex format in widespread use as printing electronic data.

While the TIFF/IT is used as raster information to be sent from the CEPS to the image processor 200, any image format as raster format image data can be used.

Color signals for an electronic manuscript assumes output in printing. Thus, the so-called color signals Y, M, C and K associated with yellow, magenta, cyan and black are used to specify colors for an electronic manuscript. Recently, a printing technology is available that uses inks of four or more colors called HiFi color, aiming at upgrading of picture quality via expansion of color reproducibility. In this technology, eight color signals including additional colors, orange and green, are used to represent an electronic manuscript. While color signals for electronic manuscripts are color signals Y, M, C and K, color signals containing four or more colors, in particular black, are applicable.

The entire image processor 200 is composed of editing apparatus communication means 210, format conversion means 220, rasterizing means 230, color conversion means 240 and output apparatus communication means 250. Electronic manuscripts in code information or raster information input from the manuscript editing means 100 are converted to a format that can be output to image output apparatus 300 via the image processor 200.

Electronic manuscripts specified in four color signals Y, M, C and K sent from the manuscript editing apparatus 100 are transferred to the image processor 200 via a network such as the Ethernet by the editing apparatus communication means 210. A page description language such as PostScript is converted by the rasterizing means 230 to raster-format image data that can be output to the image output apparatus 300.

Raster-format image data such as TIFF/IT undergoes resolution conversion and format conversion and converted to raster-format image data that can be output to the image output apparatus 300, via the format conversion means 220.

Four color signals Y, M, C and K transferred from the rasterizing means 230 and the format conversion means 220 are converted by the color conversion means 240 to four image recording signals Y, M, C and K associated with yellow, magenta, cyan and black as image recording signals in the color space for the image output apparatus 300.

Image recording signals color-converted by the color conversion means 240 are transferred to the output apparatus communication means 250. The output apparatus communication means 250 stores image recording signals processed by the image processor 200 and transfers the image recording signals to the image output apparatus 300 as required to offset the difference of processing speed between the image processor 200 and the image output apparatus 300. On the image output apparatus 300, target image is formed on paper according to four raster-format image recording signals Y, M, C and K.

In this embodiment, the ULTRA workstation from the SUN Microsystems Corp. is used as a platform for the image processor 200. The Ethernet controller installer in the workstation is used as the editing apparatus communication means 210. Further, the format conversion means 220 is configured via software using C language on the Solaris that is the UNIX-OS from the SUN Microsystems Corp.

As the rasterizing means 230, the rasterizing software CPSI from Adobe Systems is used. The color conversion means 240 is configured via software using C language on the Solaris. The output apparatus communication means 250 is configured by large-capacity memory and dedicated hardware for communications with the image output apparatus 300 on the PCI bus of the ULTRA workstation, with data input/output controlled via software on Solaris.

In this embodiment, the image processor 200 is configured by installing dedicated hardware and software in a general-purpose computer. Configuration of the image processor 200 is not limited to this configuration but may be configured by a combination of dedicated hardware and software. The portion realized by software may be realized by hardware and the portion realized by hardware may be realized by software.

It is possible to configure the system so as to reduce memory capacity necessary for storage of image data thus reducing hardware costs, by compressing and storing image data in the output apparatus communication means 250 and decompressing and transferring the data to the image output apparatus 300. In this case, it is possible to use a low-cost hard disk instead of an expensive memory thereby compressing image data.

Figure 2:
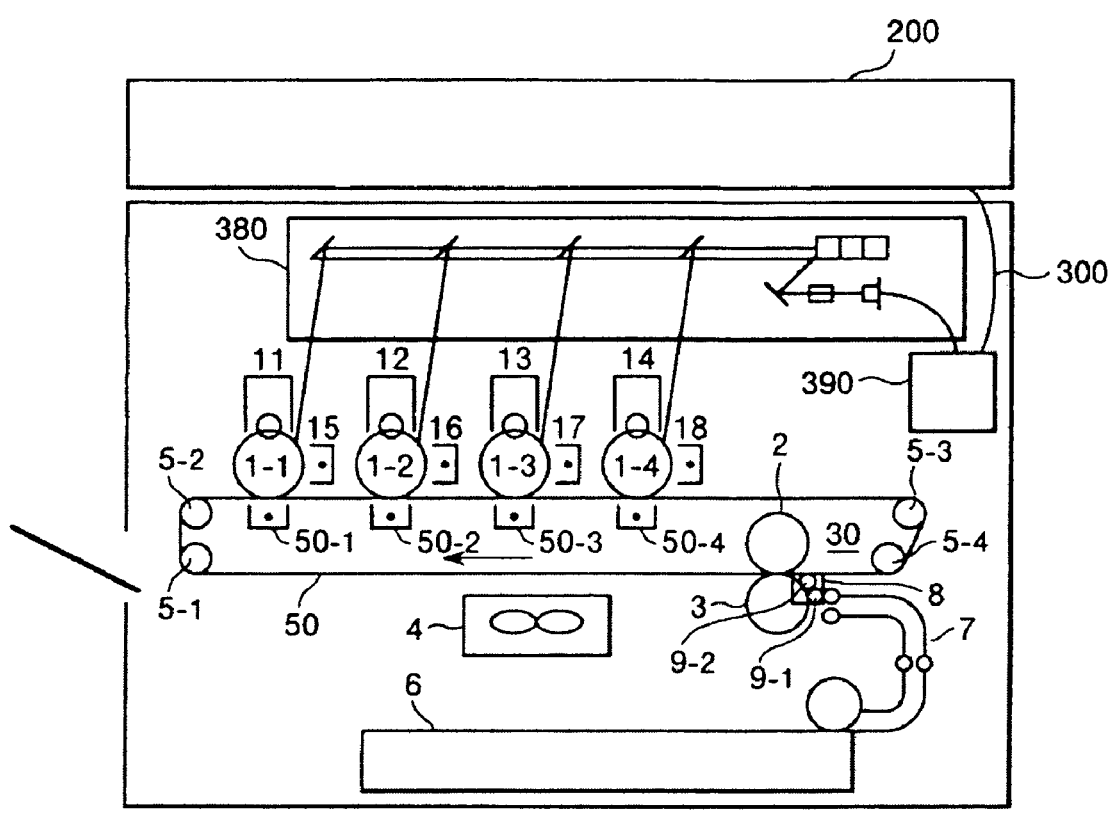
FIG. 2 is a schematic block diagram of image output apparatus according to the invention.

FIG. 2 is a schematic block diagram of the image output apparatus according to this embodiment. In FIG. 2, the sign 50 is an intermediate transfer belt and supported by rollers 5-1, 5-2, 5-3, 5-4 and a heating roller 2 to transfer picture images in the direction of the arrow. A heating roller 3 is arranged face to face with the heating roller 2.

Four photo conductors 1-1, 1-2, 1-3 and 1-4 are uniformly charged by chargers for preparing electrostatic latent images 15, 16, 17 and 18. Image recording signals Y, M, C and K transferred from the image processor undergoes horizontal scan to form electrostatic latent images on the four photo conductors 1-1, 1-2, 1-3 and 1-4 by laser scanner apparatus 390.

Next, on the electrostatic four photo conductors 1-1, 1-2, 1-3 and 1-4 where electrostatic latent images are formed, toner images in black, yellow, magenta and cyan are respectively formed by a black processor 11, a yellow processor 12, a magenta processor 13 and a cyan processor 14. These toner images are sequentially transferred to the intermediate transfer belt by transfer units 50-1, 50-2, 50-3 and 50-4 to form toner images in a plurality of colors on the intermediate transfer belt.

After that, recording paper fed by a paper feeder 7 from a paper tray 8 is heated while being wound around the heating roller 3 via pin rollers 9-1 and 9-2 attached to a winding mechanism 8, then pressurized and heated in close contact with the intermediate transfer belt 50 by the heating roll 2 and the heating roll 3. This causes the toner to be transferred on the recording paper. The intermediate transfer belt 50 and the recording paper pressurized and heated by the heating roll 2 and the heating roll 3 move in close contact and cooled by cooling apparatus 4.

Thus, the toner transferred on the recording paper is solidified and generates a strong adhesive strength and fixed on the recording paper. Then, on the small-curvature toll 5-1, the recording paper is detached together with the toner from the intermediate transfer belt 50 due to the stiffness of the recording paper, to form a color image.

As photo conductors 1-1, 1-2, 1-3 and 1-4, various types of organic photo conductors can be used as well as various types of inorganic photo conductors such as Se, a-Si, a-SiC and CdS. The toner is composed of a thermoplastic binder containing pigments such as yellow, magenta and cyan and can use known materials. In this embodiment, polyester toner of a weight molecular weight of 54000, a softening point of 1130° C. and an average grain diameter of 7 micrometers is used.

The aforementioned exposure conditions and processing conditions is set so that the toner amount of each color on recording media may fall within the range of about 0.4 mg/cm$^2$ to 0.7 mg/cm$^2$ depending on the content of pigments. In this embodiment, 0.65 mg/cm$^2$ is specified for each color. The recording media is plain paper or coated paper on the market. In this embodiment, J-coat paper from Fuji Xerox Co., Ltd. is used.

The intermediate transfer belt 50 is composed of two layers, the base layer and the surface layer. The base layer is a polyimide film 70 μm in thickness with black carbon added. The volume resistivity is adjusted to $10^{10}$ Ωcm with additive amount of carbon black changed. As the base layer, for example, a high heat-resistant sheet 10 to 300 μm in thickness can be used. A polymer sheet of polyester, polyethylene terephthalate, polyether surfone, polyether ketone, polysurfone, polyimide, polyimide amide, or polyamide.

The volume resistivity of the surface layer is adjusted to $10^{14}$ Ωcm in order to transfer toner images from a photo conductor to an intermediate transfer belt without electrostatic disturbance of images. In order to sandwich a toner image and improve adhesion of the intermediate transfer belt and paper in simultaneous transfer and fixing from the intermediate transfer belt to the paper, a silicon copolymer of 40 degrees in rubber hardness and 50 μm in thickness.

The silicon copolymer shows tackiness to toner at room temperatures. To transfer toner to recording media efficiently, the silicon copolymer has characteristic of easily releasing melted and fluidized toner. Thus the silicon copolymer is an optimum material as a surface layer. It is possible to use a resin layer 1 to 100 μm in thickness with high mold releasing capability as a surface layer. For example, it is possible to use tetrafluoroethylene-perfluoroalkyl vinyl ether copolymer and polytetrafluoroethylene.

As a heating roller, it is possible to use a metallic roller or a metallic roller equipped with a heat-resistant elastic layer. Inside the heating roller is arranged a heat source, whose set temperature is determined by the thermal melting property of toner and a thermoplastic resin layer on the recording paper. Here, the softening point of toner should be higher than the softening point of a resin layer, temperature setting is made so that the set temperature of the heating roller 2 may exceed the set temperature of the heating roller 3. In this embodiment, the heating roller 2 is set to 150° C. and the heating roller 120° C., respectively.

While the pressure of the heating roll 2 and heating roll 3 in transfer and fixing is set to 5 kgf/cm$^2$, the pressure value is not limited to this value but may fall within the range of 1 kgf/cm$^2$, to 10 kgf/cm$^2$. The diameter of the heating roller 3 is 5 mm and the revolution speed of the heating rollers is set so that the carrying speed of the intermediate transfer body may reach 240 mm/sec.

In this embodiment, the temperature on the surface of the recording media that comes in contact with the intermediate transfer belt, assumed when the media is released from the intermediate transfer belt is set to 70° C., by adjusting the wind amount of the cooling apparatus 4.

While a color printer of the tandem engine electronic photography system is applied as image output apparatus 300 in this embodiment, the image output apparatus is not limited to this but a system may be used in which a heat-resistant belt photo conductor is used instead of the single engine system or intermediate transfer belt, to directly transfer and fix a plurality of toner images formed on the belt photo conductor.

The image output apparatus 30 is not limited to a color printer of the electronic photography system but any output apparatus may be used that records images by using four-variable color signals, in particular color signals Y, M, C and K. For example, ant color image output apparatus such as printing, ink-jet system, thermal transfer system and silver halide system may be used.

Figure 3:
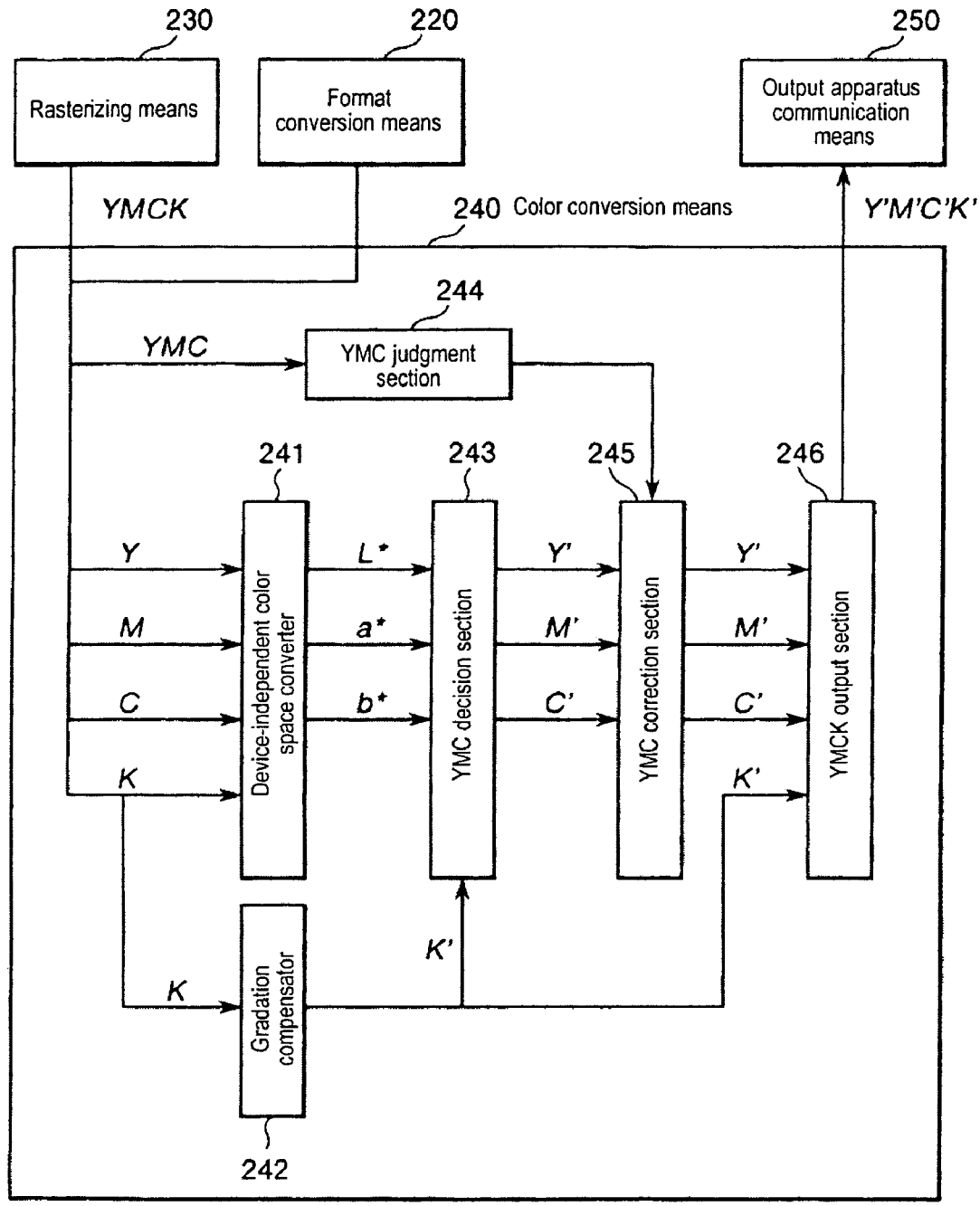
FIG. 3 shows details of color conversion processing by color conversion means.

Next, the color conversion means 240 that is a main section of this embodiment will be described. FIG. 3 shows details of the color conversion processing via the color conversion means 240. Out of the four color signals Y, M, C and K as the first color signals transferred from the rasterizing means 230 and the format conversion means 220, four color signals Y, M, C and K are input to the device-independent color space converter 241, a color signal K to the gradation compensator 242, and three color signals Y, M and C to the YMC judgment section 244.

Four color signals Y, M, C and K input to the device-independent color space converter 241 are converted to the L*a*b* color space as a device-independent color space and input to the YMC decision section 243. The color signal K input to the gradation compensator 242 is converted to the image recording signal for the image output apparatus 300, that is, a color signal K' having the equivalent lightness out of the second color signals Y', M', C' and K', then transferred to the YMC decision section 243 and a YMCK output section 246.

The YMC judgment section 244 judges the case where input three color signals Y, M and C are simultaneously zero and sends the judgment flag to a YMC correction section 245. The YMC decision section 243 determines color signals Y', M' or C' for the image output apparatus 300 that is identical with the L*a*b* color signal input with its black addition amount being under conditions of the color signal K', from the color signal L*a*b* input from the device-independent color space converter 241 and the signal K' input from the gradation compensator 242.

The YMC correction section 245, on receiving the judgment flag from the YMC judgment section, sets all the color signals Y', M' and C' input from the YMC decision section 243 to zero and transfers the signals to the YMCK output section 246. The YMCK output section 246 transfers the color signals Y', M' and C' input from the YMC correction section 245 and the color signal K' input from the gradation compensator 242 to the output apparatus communication means 300.

The device-independent color space converter 241 can use a color conversion circuit of the matrix operation type, a color conversion circuit of the direct lookup table, and a color conversion circuit of the Neural Network type, each of which is in widespread use as a color conversion circuit.

The color conversion coefficient of the device-independent color space converter 241 is determined in the following way. First, a patch is output for printed material corresponding to an arbitrary combination of color signals Y, M, C and K for printing input from the manuscript editing apparatus 100. The colorimetric values (L*a*b*) of the patch are measured via a calorimeter on the market to obtain the calorimetric values for printing (L*a*b*) corresponding to color signals Y, M, C and K to be input and model the conversion characteristics of the calorimetric values (L*a*b*) for the input data (Y, M, C, K).

While a higher polynomial or Neural Network is used for such a model, in this embodiment, the Neural Network is instructed to study a data set comprising a combination of YMCK data and L*a*b* data, and the color characteristics of printing to be input are modeled. The device-independent color space converter 241 uses the obtained Neural Network in the color converter without modification.

In this embodiment, the Neural Network as defined in *K. Murai, Furekishiburu UCR niyoru kouseido irohenkan~Neural Network niyoru kouseido purinnta-moderu~, Japan Hard Copy '94 ronnbunnshuu*, pp. 181–184 is used as a Neural Network and study is performed via the back propagation method.

While the representative color space used as standard colors in the printing industry is SWOP in the U.S.A. and JapanColor in Japan, the color conversion coefficient of the JapanColor is obtained in this embodiment. As a data set used for obtaining the color conversion coefficient, Japan-Color 928 patch calorimetric data standardized in the international standard ISO12642 is used. Other color space and data sets for printing may be used to obtain the color conversion coefficient.

The device-independent color space converter 241 can typically use the color space that converts input color signals to the L*a*b* color space. While the following example pertains to a case where input color signals are converted to the L*a*b* color space, conversion to another color space, such as the XYZ color space or L*a*b* color space is allowed. Note that conversion to a perceptual uniform color space is desirable.

Further, the device-independent color space converter 241 may be adapted to input color signals containing five or more colors including black, as well as four color signals Y, M, C and K. Color signals containing five or more colors include, for example, HiFiColor containing six colors, that is, four colors Y, M, C and K plus green and orange. Color signals containing five or more colors can be converted to the device-independent color space via similar means and method. In case color signals containing for example six colors are input, the 6-input 3-output Neural Network can be applied to the device-independent color space converter 241.

Figure 4:
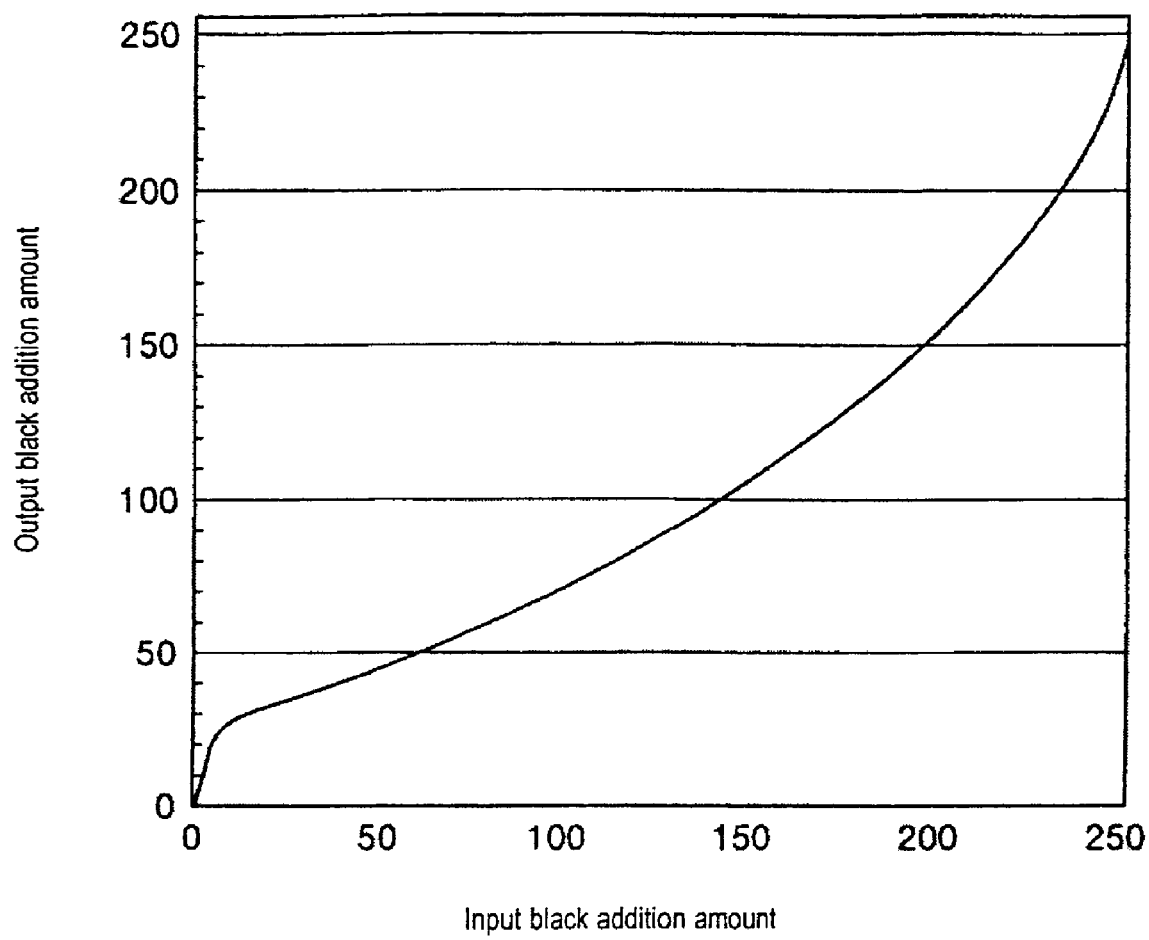
FIG. 4 shows an example of one-dimensional lookup table.

In the gradation compensator 242, the one-dimensional lookup table is used to convert an input signal K for printing to a color signal K' for the image output apparatus 300 that has an equivalent lightness. FIG. 4 shows an example of one-dimensional lookup table that converts an input black addition amount K for printing to an input black addition amount K' for the image output apparatus 300.

In FIG. 4, horizontal axis and vertical axis show the 8-bit quantified values of the screen coverage ratio of black addition amount K and K', respectively. In creating a lookup table, lightness L* assumed when the screen coverage ratio is changed from 0 to 255 is measured in advance, and the value of the output black addition amount K' that has the lightness equivalent to the lightness L* of the input black addition amount K is obtained, then set as a lookup table value.

In this embodiment, in order to precisely compensate for the gradation of the input/output black addition amount, one-dimensional lookup table is used as the gradation compensator 242. However, any mechanism that can describe the one-dimensional input/output relationship, such as a function formula, is applicable, and the number of quantifying divisions of the lookup table is not limited to 8 bits.

While the conversion characteristics of the gradation compensator 242 are specified so that consistency of lightness of black addition amount may be obtained between input and output, setting can be made so that consistency of density of black addition amount may be obtained between input and output. It is desirable that the exact consistency of lightness or density may be obtained between input and output. However, conversion characteristics can be specified so that equivalent lightness or density may be obtained, not the exactly identical lightness or density.

The YMC decision section 243 obtains the relationship between image recording signals Y', M', C' and K' and the colorimetric values L*a*b* in the device-dependent color space in advance. This relationship is hereinafter referred to as the color conversion model. The YMC decision section 243 then numerically solves the color conversion model from the L*a*b* color signals obtained from the device-independent color space converter 241 and the color signal K' obtained from the gradation compensator 242 to determine the remaining three color signals Y', M' and C' for the image output apparatus 300 that are calorimetrically identical to the input L*a*b*, with black addition amount for the image output apparatus 300 being K'.

How to prepare the color conversion model for the image output apparatus 300 is described below. First, a color patch is output corresponding to an arbitrary combination of image recording signals color signals Y, M, C and K for the image output apparatus 300 is printed out on the image output apparatus 300 and the calorimetric values L*a*b* of the patch are measured via a calorimeter.

In this embodiment, a combination of 6×6×6×6=1296 patches with the screen coverage ratio of each color being incremented by 20% is printed out as a combination of image recording signals Y', M', C' and K', on the image output apparatus 300. Then, the colorimetric values L*a*b* in a field of 2 degrees are measured under the measurement conditions of D50, by using the colorimeter X-Rite 938 from the X-Rite Company. While an arbitrary number of color patches may be used for measurement, it is desirable to use as many patches as possible for a higher-accuracy color conversion model.

While the uniform color space L*a*b* color system is used as a color system for measurement in this embodiment, another color system such as the XYZ color system may be used. Note that a uniform color space is preferable in order to evaluate the color difference in solving the color conversion model.

Next, the Neural Network is instructed to study a data set of plural signals Y', M', C' and K' and L*a*b* obtained as instructor data. The relationship between the signals Y', M', C' and K' and L*a*b* is represented by the following function.

$$(L^*, a^*, b^*) = F(Y', M', C', K') \quad (1)$$

where, formula (1) is dissolved into color components:

$$L^* = FL(Y', M', C', K') \quad (2)$$

$$a^* = Fa(Y', M', C', K') \quad (3)$$

$$b^* = Fb(Y', M', C', K') \quad (4)$$

In this embodiment, the Neural Network as defined in *K. Murai, Furekishiburu UCR niyoru kouseido irohenkan~Neural Network niyoru kouseido purinntamoderu~, Japan Hard Copy '94 ronnbunnshuu*, pp. 181–184 is used as a Neural Network and study is performed via the back propagation method. While the Neural Network is used as a color conversion model in this embodiment, it is possible to apply another polynomial model or color conversion model of conversion table system.

Next, numerical solution of the color conversion model will be described. The inverse function of the ordinary function F is not obtained. However, in case L*a*b* is given and one variable out of Y', M', C' and K is properly determined, the remaining three variables can be obtained from the formula (1). For example, in case K' is given, Y', M' and C' is determined. Assuming the colors to be reproduced as L*a*b* and black addition amount as K', color difference ΔE between colors to be reproduced and the image recording signals Y', M' and C' and black addition amount K' is defined as a function of image recording signals Y', M' and C' in the following formula.

$$\Delta E(Y', M', C') = ((L^* - FL(Y', M', C', K'))^2 + (a^* - Fa(Y', M', C', K'))^2 + (b^* - Fb(Y', M', C', K'))^2)^{1/2} \quad (5)$$

Solving the non-linear equation (1) is the same as obtaining the values of Y', M' and C' assumed when the color difference ΔE equals zero. Thus, the procedure for solving the equation (1) may be considered as a non-linear optimization problem of Y', M' and C' that minimizes the objective function ΔE by making the color difference ΔE the objective function. Therefore, it is possible to solve the equation (1) by using the non-linear optimization approach such as the simplex method.

For the simplex method, corresponding algorithm is introduced, for example, in H. Konno, *Hisenkei keikakuho, Nikkagirenshuppansha*, pp. 284–286. The simplex method is an approach suited for optimization of a multi-variable function and allows the optimized value to be obtained at a high speed.

In this embodiment, the simplex method that can optimize a multi-variable function at a high speed as a non-linear optimization approach is applied. Any non-linear optimization approach may be used and other non-linear optimization approaches such as the dichotomy and the golden section exploration method may be applied. Numerical solution of a non-linear equation such as the Newton method may be applied to solve the color conversion model.

In this way, it is possible to determine the remaining three color signals Y', M' and C' for the image output apparatus 300 that are calorimetrically identical to the input L*a*b*, with black addition amount for the image output apparatus 300 being K', from the L*a*b* color signals obtained from the device-independent color space converter 241 and the color signal K' obtained from the gradation compensator 242.

The YMC judgment section 244 judges whether or not the three input color signals Y, M and C are simultaneously zero, and sends the judgment flag to a YMC correction section 245. The YMC correction section 248, on receiving the judgment flag from the YMC judgment section 244, sets all the image recording signals Y', M' and C' input from the YMC decision section 243 to zero. As a result, it is possible to reproduce black text and black thin lines represented in a single black color in a manuscript, thereby considerably upgrading the reproducibility of black text and black thin lines.

Meanwhile, for the portion where a single black color is specified for input and output, a small color difference will result by correcting the color signals Y', M' and C' even when the consistency of lightness is obtained, due to difference in the color material or image structure between printing and the image output apparatus 300. This color difference is, however, negligible visually.

In the invention, for the portion where a single black color is not specified in an electronic manuscript, colorimetric consistency is assured in principle. Thus, it is possible to obtain visually exact consistency between the printing color specified in the input electronic manuscript and the color printed on the image output apparatus 300.

This embodiment is configured so that the YMC correction section 244, on receiving the judgment flag from the YMC judgment section 244, sets all the image recording signals Y', M' and C' input from the YMC decision section 243 to zero. Correction of Y', M' and C' may be skipped when more accuracy in color consistency between input and output is desired.

In case the color characteristics of the input color signals Y, M, C and K for printing are close to those of the color signals Y, M, C and K for color printers, reproduction of black text or black thin lines in a single black color may be acceptable visually even when correction of Y', M' and C' by the YMC correction section 245 is skipped. In such a case also, it is possible to skip correction of Y', M' and C' by the YMC correction section 245. Note that it is preferable to perform correction of Y', M' and C' by the YMC correction section 245 as in this embodiment, in order to assure reproduction of black text and black thin lines in a single black color.

Finally, color conversion processing by the color conversion means completes when the YMCK output section 246 transfers image recording signals Y', M', C' and K' to be input to the image output apparatus 300 via the output apparatus communication means 250.

Figure 5:
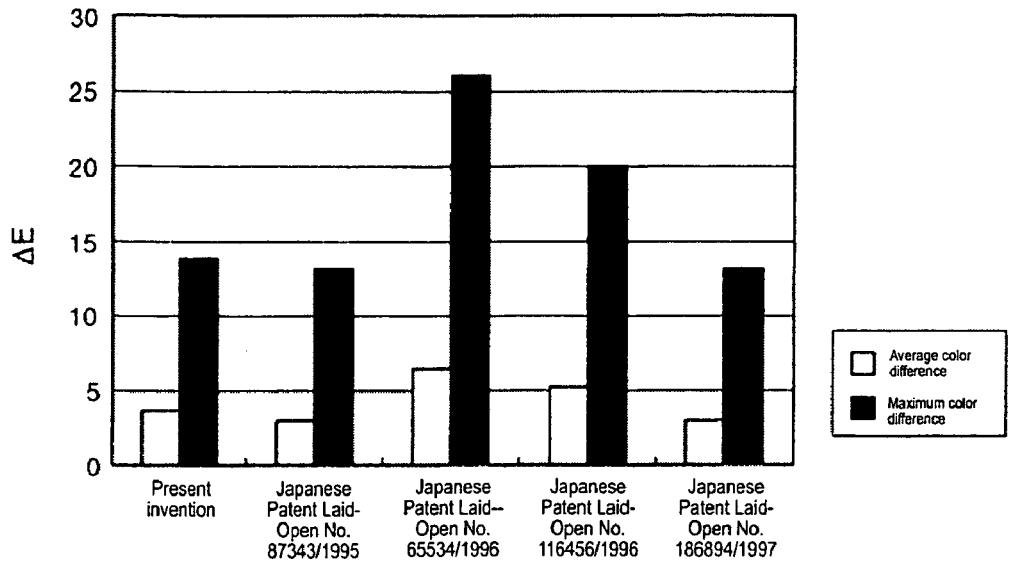
FIG. 5 shows comparison between the invention and the related art.

In order to check the validity of the invention, FIG. 5 shows the evaluation results of the color conversion accuracy and reproduction of black text or black thin lines in a single black color on five configurations: a configuration in which the color conversion means is adapted according to the embodiment of the invention; a configuration in which color signals Y, M, C and K for printing are converted to device-independent color signals and then to color signals Y', M', C' and K' for the image output apparatus 300, represented by the Japanese Patent Laid-Open No. 787347/1995, a configuration in which four color signals Y, M, C and K are split into three color signals Y, M and C and a color signal K and color conversion is performed on three colors Y, M and C by using a higher determinant and color conversion is performed on the color signal K by using one-dimensional lookup table, represented by the Japanese Patent Laid-Open No. 65534/1996; a configuration in which four color signals Y, M, C and K are split into three color signals Y, M and C and a color signal K and color conversion is performed on three colors Y, M and C by using a third-dimensional lookup table and color conversion is performed on the color signal K by using one-dimensional lookup table, represented by the Japanese Patent Laid-Open No. 116456/1996; and a configuration in which color signals Y, M, C and K for printing are converted to device-independent color signals and the black addition ratio and the device-independent color signals and the black addition ratio are converted to color signals Y', M', C' and K' for image output apparatus 300, represented by the Japanese Patent Laid-Open No. 186894/1997.

To the configuration of the color conversion means 240 other than the invention, the embodiment of the related art as shown previously is shown as it is. As a color conversion accuracy, the average value and the maximum value of the color difference in calorimetric value between the color patch data on 928 data pieces for printing that conforms to ISO12842 and the printout on the image output apparatus 300. For reproduction in a single black color, the mark ○ is given when data specified in a single black color in an electronic manuscript can be reproduced perfectly in a single black color on the image output apparatus, and the mark X otherwise.

As understood from FIG. 5, according to a method in which color signals Y, M, C and K for printing are converted to device-independent color signals and then to color signals Y', M', C' and K' for the image output apparatus 300, represented by the Japanese Patent Laid-Open No. 87347/1995, and a method in which color signals Y, M, C and K for printing are converted to device-independent color signals and the black addition ratio and the device-independent color signals and the black addition ratio are converted to color signals Y', M', C' and K' for image output apparatus 300, represented by the Japanese Patent Laid-Open No. 186894/1997, reproduction in a single black color is impossible although the color conversion accuracy is high.

It is understood that, according to a method in which four color signals Y, M, C and K are split into three color signals Y, M and C and a color signal K and color conversion is separately performed on three colors Y, M and C, and on the color signal K, represented by the Japanese Patent Laid-Open No. 65534/1996 and the Japanese Patent Laid-Open No. 116456/1996, the color conversion accuracy is very low although reproduction in a single black color is possible.

The invention, while reproduction in a single black color is possible, a high color conversion accuracy equivalent to that in the Japanese Patent Laid-Open No. 87347/1995 and the Japanese Patent Laid-Open No. 186894/1997 is realized, and both the high color reproducibility and favorable reproduction of black text and black thin lines are realized.

As mentioned earlier, device-independent color signals L*a*b* on the color system color coordinates are obtained from four color signals Y, M, C and K specified by the manuscript editing apparatus. A black color signal K' for the image output apparatus 300 is determined that has the lightness equivalent to the lightness of the input black color signal K. From the determined black color signal K' and the device-independent color signals L*a*b*, the remaining three variable color signals Y, M' and C' are determined by solving the color conversion model for the image output apparatus 300 by using the numerical solution, so that colorimetric consistency between the remaining three variable color signals Y, M' and C' and the device-independent color signals L*a*b* may be obtained. When color signals Y, M and C other than the input signal K are all zero, the remaining three variable color signals Y', M' and C' are corrected to be zero. In this way, both the high color consistency between input and output and favorable reproduction in a single black color of black text and black thin lines specified in a single black color in an electronic manuscript, with a consistent lightness, are realized.

Figure 6:
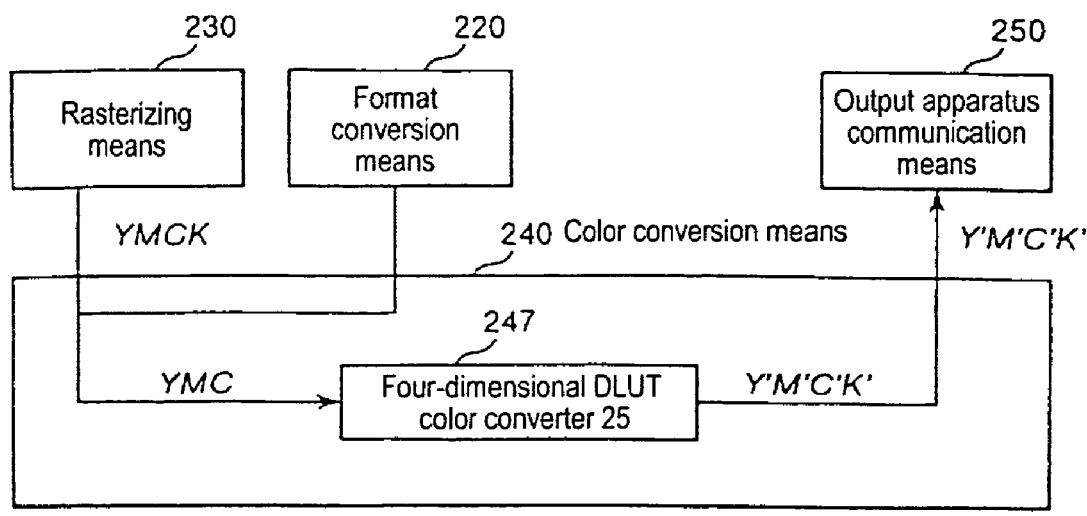
FIG. 6 is a block diagram that shows the main sections of the second embodiment.

Next, the second embodiment of the invention will be described. While the second embodiment of the invention is similar to the configuration shown in FIG. 1, like the first embodiment, the configuration of the color conversion means 240 is different. The remaining configuration is the same as that of the first embodiment. FIG. 6 is a block diagram of the main sections of the second embodiment. In this embodiment, the color conversion means 240 is configured by a 4-input 4-output four-dimensional DLUT color converter 247.

The four-dimensional DLUT color converter 247 is configured by a four-dimensional direct lookup table that uses the value obtained by dividing each axis of input color signals Y, M, C and K by 16 as an input address and performs interpolation operation via cubic interpolation to calculate image recording signals Y', M', C' and K' for the image output apparatus 300.

While the cube interpolation is applied as an interpolation system for the direct lookup table in this embodiment, other known systems such as the prism interpolation and tetrahedral interpolation may be applied. Number of divisions of each input axis may be other than 16.

While the color conversion means 240 is configured by a four-dimensional direct lookup table in this embodiment, this is not limiting but any known color conversion system such as the Neural Network may be applied as long as 4-input 4-output color conversion is realized.

In this embodiment, the color conversion means does not limit the input color signals to four color signals Y, M, C and K but color signals containing five or more colors including black may be input. Four color signals used for printing include, for example, HiFiColor containing six colors, that is, four colors Y, M, C and K plus green and orange.

Color signals containing five or more colors can be converted to the image recording signals containing four colors via similar means and method. For example, in case six color signals are input, a 6-input 4-output six-dimensional direct lookup table may be applied to the color conversion means.

FIG. 7 shows the steps for determining color conversion parameters for the four-dimensional DLUT color converter in this embodiment. In step 1, a patch is output for printed material corresponding to an arbitrary combination of color signals Y, M, C and K for printing input from the manuscript editing apparatus 100. The corresponding colorimetric values L*a*b* are measured via a colorimeter on the market.

Then, the calorimetric values L*a*b* in a field of 2 degrees are measured under the measurement conditions of D50, by using the calorimeter X-Rite 938 from the X-Rite Company. While an arbitrary number of color patches may be used for measurement, it is desirable to use as many patches as possible for a higher-accuracy color conversion model.

While the uniform color space L*a*b* color system is used as a color system for measurement in this embodiment, another color system such as the XYZ color system may be used. As a color space and a data set for printing, JapanColor 928 patch calorimetric data standardized in the international standard ISO12642 is used. Other color space and data sets for printing may be used.

In step 2, the Neural Network is instructed to study a data set of plural signals Y, M, C and K and L*a*b* obtained in step 1 as instructor data. In this embodiment, this Neural Network is called Neural Network 1. While a higher polynomial, conversion table system or Neural Network is generally used for such a color conversion model, the Neural Network is instructed to study a data set comprising a combination of YMCK data and L*a*b* data to model the input color characteristics for printing in this embodiment.

In this embodiment, a Neural Network similar to that in the first embodiment is used and study is performed via the back propagation method. Input color signals are not limited to four color signals Y, M, C and K but color signals containing five or more colors including black may be input.

Next, in step 3, a color patch corresponding to an arbitrary combination of image recording signals Y', M', C' and K' for the image output apparatus 300 is printed out on the image output apparatus 300 and the corresponding colorimetric values L*'a*'b*' are measured via a colorimeter. In this embodiment, a combination of 6×6×6×6=1296 patches with the screen coverage ratio of each color being incremented by 20% is printed out as a combination of image recording signals Y', M', C' and K', on the image output apparatus 300. Then, the calorimetric values L*a*b* in a field of 2 degrees are measured under the measurement conditions of D50, by using the colorimeter X-Rite 938 from the X-Rite Company.

While the uniform color space L*a*b* color system is used as a color system for measurement in this embodiment, another color system such as the XYZ color system may be used. Note that a uniform color space is preferable in order to evaluate the color difference in solving the color conversion model.

In step 4, the Neural Network is instructed to study a data set of plural signals Y', M', C' and K' and L*'a*'b*' obtained as instructor data. In this embodiment, this Neural Network is called Neural Network 2. In this embodiment, a Neural Network similar to that in the first embodiment is used and study is performed via the back propagation method.

In step 5, calorimetric values L*a*b* for the input address values Y, M, C and K of the four-dimensional DLUT color converter 247 are determined by using the Neural Network obtained in step 2.

Next, in step 6, black addition amount K' for the image output apparatus 300 that has an equivalent lightness to that of the input address value K of the four-dimensional DLUT color converter 247 is determined by using the one-dimensional lookup table. In this embodiment, same as the first embodiment, the number of quantifying divisions of the one-dimensional lookup table is 8 bits. In creating a lookup table, lightness L* assumed when the screen coverage ratio is changed from 0 to 255 is measured in advance, and the value of the output black addition amount K' that has the lightness equivalent to the lightness L* of the input black addition amount K is obtained, then set as a lookup table value.

In this embodiment, in order to precisely compensate for the gradation of the input/output black addition amount, one-dimensional lookup table is used in step 6. However, any mechanism that can describe the one-dimensional input/output relationship, such as a function formula, is applicable, and the number of quantifying divisions of the lookup table is not limited to 8 bits.

Setting can be made so that consistency of density of black addition amount may be obtained between input and output. Conversion characteristics can be specified so that equivalent lightness or density may be obtained, not the exactly identical lightness or density.

In step 7, by solving Neural Network 2 by using the numerical solution from the calorimetric values L*a*b* for the input address values Y, M, C and K of the four-dimensional DLUT color converter 247 and the black addition amount K' for the image output apparatus 300 that has an equivalent lightness to that of the input address value K of the four-dimensional DLUT color converter 247, the remaining image recording signals Y', M', C' and K' for the image output apparatus 300 that are colorimetrically identical to the L*a*b*, with black addition amount being K' are obtained. Numerical solution of Neural Network 2 uses a similar approach to that in the first embodiment.

Next, in step 8, when the input address values Y, M and C of the four-dimensional DLUT color converter 247 are all zero, the image recording signals Y', M', C' and K' obtained in step 7 are all corrected to be zero. In this way, black text and black thin lines specified in a single black color in an electronic manuscript can be reproduced in a single black color that has the same lightness by the image output apparatus 300. This considerably upgrades the reproducibility of black text and black thin lines.

While the image recording signals Y', M', C' and K' are all corrected to be zero in step 8 when the input address values Y, M and C of the four-dimensional DLUT color converter 247 are all zero in this embodiment, step 8 may be skipped when more accuracy in color consistency between input and output is desired.

In case the color characteristics of the input color signals Y, M, C and K for printing are close to those of the color signals Y, M, C and K for color printers, reproduction of black text or black thin lines in a single black color may be acceptable visually even when correction of Y', M'and C' in step 8 is skipped.

In such a case also, it is possible to skip step 8. Note that it is preferable to perform correction of Y', M' and C' in step 8 as in this embodiment, in order to assure reproduction of black text and black thin lines in a single black color.

Finally, in step 9, by setting the image recording signals Y', M', C' and K' obtained in step 8 and the black addition amount K' obtained in step 7 to lattice points of the four-dimensional DLUT color converter 247, it is possible to determine the color conversion parameters of the four-dimensional DLUT color converter 247.

Via the configuration shown in this embodiment, it is possible to perform direct color conversion by using the direct lookup table without configuring the color conversion means 240 by the color conversion processing that has a number of operations, as well as the advantages shown in the first embodiment. This realizes a very fast color conversion. In case hardware is used to realize this embodiment, the embodiment can be realized with hardware easily because of reduced operations.

Next, the third embodiment of the invention will be described. While the third embodiment of the invention is similar to the configuration shown in FIG. 1, like the first embodiment, the configuration of the color conversion means 240 is different. The remaining configuration is the same as that of the first embodiment.

FIG. 6 is a block diagram of the main sections of the second embodiment. In this embodiment, the color conversion means 240 is configured by a 4-input 3-output DLUT color converter 248 and a one-dimensional LUT gradation converter 249.

The 4-input 3-output DLUT color converter 248 is configured by a four-dimensional direct lookup table that uses the value obtained by dividing each axis of image input color signals Y, M, C and K by 16 as an input address and performs interpolation operation via cubic interpolation to calculate image recording signals Y', M' and C' for the image output apparatus 300.

While the cubic interpolation is applied as an interpolation system for the direct lookup table in this embodiment, other known systems such as the prism interpolation and tetrahedral interpolation may be applied. Number of divisions of each input axis may be other than 16.

While the 4-input 3-output DLUT color converter 248 is configured by a four-dimensional direct lookup table in this embodiment, this is not limiting but any known color conversion system such as the Neural Network may be applied as long as 4-input 3-output color conversion is realized.

The one-dimensional LUT gradation converter 249 converts the black addition amount K' for the image output apparatus 300 that has an equivalent lightness to that of the black addition amount K by using the one-dimensional lookup table. In this embodiment, same as the first embodiment, the number of quantifying divisions of the one-dimensional lookup table is 8 bits. In creating a lookup table, lightness L* assumed when the screen coverage ratio is changed from 0 to 255 is measured in advance, and the value of the output black addition amount K' that has the lightness equivalent to the lightness L* of the input black addition amount K is obtained, then set as a lookup table value.

In this embodiment, in order to precisely compensate for the gradation of the input/output black addition amount, one-dimensional lookup table is used for the one-dimensional LUT gradation converter 249. However, any mechanism that can describe the one-dimensional input/output relationship, such as a function formula, is applicable, and the number of quantifying divisions of the lookup table is not limited to 8 bits. Setting can be made so that consistency of density of black addition amount may be obtained between input and output. Conversion characteristics can be specified so that equivalent lightness or density may be obtained, not the exactly identical lightness or density.

In this embodiment, the color conversion means does not limit the input color signals to four color signals Y, M, C and K but color signals containing five or more colors including black may be input. Four color signals used for printing include, for example, HiFiColor containing six colors, that is, four colors Y, M, C and K plus green and orange. Color signals containing five or more colors can be converted to the image recording signals containing four colors via similar means and method.

For example, in case six color signals are input, black addition signals may be converted by using a one-dimensional lookup table and the six input color signals may be converted to three variable color signals other than black out of the image recording signals by using a 6-input 3-output six-dimensional direct lookup table.

By configuring the color conversion means 240 by a 4-input 3-output DLUT color converter 248 and a one-dimensional LUT gradation converter 249 as in this embodiment, compared with the case where the color conversion means 240 is configured by a 4-input 4-output four-dimensional direct lookup table as in the second embodiment, the table memory for the one-dimensional LUT gradation converter 249 is necessary but the number of lattice points in the four-dimensional direct lookup table is reduced to three fourth. Thus it is possible to reduce table memory considerably to realize the color conversion means 240 at a low cost.

Comparing the second embodiment with this embodiment, 1 byte×4=4 bytes for four colors Y', M', C' and K' is required as lattice point data for each of the input addresses 17×17×17×17=83521, thus the table memory capacity totals 83521×4 bytes=33408 bytes in the second embodiment. In this embodiment, table memory capacity of 83521×3 bytes=249753 bytes is required in the 4-input 3-output DLUT color converter 248 and table memory capacity of 1 byte is required in the one-dimensional LUT gradation converter 249, thus table memory capacity totals 249753 bytes. In this embodiment, the color conversion means 240 can be realized using a very small table memory of approximately three fourth the total in the second embodiment 2.

FIG. 9 shows the steps for determining color conversion parameters for the 4-input 3-output DLUT color converter 248 in this embodiment. In step 1', a patch is output for printed material corresponding to an arbitrary combination of color signals Y, M, C and K for printing input from the manuscript editing apparatus 100. The calorimetric values L*a*b* of the patch are measured via a calorimeter on the market.

Then, the calorimetric values L*a*b* in a field of 2 degrees are measured under the measurement conditions of D50, by using the colorimeter X-Rite 938 from the X-Rite Company. While an arbitrary number of color patches may be used for measurement, it is desirable to use as many patches as possible for a higher-accuracy color conversion model. While the uniform color space L*a*b* color system is used as a color system for measurement in this embodiment, another color system such as the XYZ color system may be used.

As a color space and a data set for printing, JapanColor 928 patch colorimetric data standardized in the international standard ISO12842 is used. Other color space and data sets for printing may be used.

In step 2', the Neural Network is instructed to study a data set of plural signals Y, M, C and K and L*a*b* obtained in step 1' as instructor data. In this embodiment, this Neural Network is called Neural Network 1.

While a higher polynomial, conversion table system or Neural Network is generally used for such a color conversion model, the Neural Network is instructed to study a data set comprising a combination of YMCK data and L*a*b* data to model the input color characteristics for printing in this embodiment.

In this embodiment, a Neural Network similar to that in the first embodiment is used and study is performed via the back propagation method. Input color signals are not limited to four color signals Y, M, C and K but color signals containing five or more colors including black may be input.

Next, in step 3', a color patch is output corresponding to an arbitrary combination of image recording signals color signals Y, M, C and K for the image output apparatus 300 is printed out on the image output apparatus 300 and the calorimetric values L*'a*'b*' of the patch are measured via a calorimeter. In this embodiment, a combination of 6×6×6×6=1296 patches with the screen coverage ratio of each color being incremented by 20% is printed out as a combination of image recording signals Y', M', C' and K', on the image output apparatus 300. Then, the colorimetric values L*a*b* in a field of 2 degrees are measured under the measurement conditions of D50, by using the colorimeter X-Rite 938 from the X-Rite Company.

While the perceptual uniform color space L*a*b* color system is used as a color system for measurement in this embodiment, another color system such as the XYZ color system may be used. Note that a perceptual uniform color space is preferable in order to evaluate the color difference in solving the color conversion model.

In step 4', the Neural Network is instructed to study a data set of plural signals Y', M', C' and K' and L*'a*'b*' obtained as instructor data. In this embodiment, this Neural Network is called Neural Network 2. In this embodiment, a Neural Network similar to that in the first embodiment is used and study is performed via the back propagation method.

In step 5', colorimetric values L*a*b* for the input address values Y, M, C and K of the 4-input 3-output DLUT color converter 248 are determined by using the Neural Network obtained in step 2'.

Next, in step 6', the one-dimensional lookup table is used to determine black addition amount K' for the image output apparatus 300 that has an equivalent lightness to that of the input address value K of the 4-input 3-output DLUT color converter 248. In this embodiment, same as the first embodiment, the number of quantifying divisions of the one-dimensional lookup table is 8 bits. In creating a lookup table, lightness L* assumed when the screen coverage ratio is changed from 0 to 255 is measured in advance, and the value of the output black addition amount K' that has the lightness equivalent to the lightness L* of the input black addition amount K is obtained, then set as a lookup table value.

In this embodiment, same as the first embodiment, the number of quantifying divisions of the one-dimensional lookup table is 8 bits. In creating a lookup table, lightness L* assumed when the screen coverage ratio is changed from 0 to 255 is measured in advance, and the value of the output black addition amount K' that has the lightness equivalent to the lightness L* of the input black addition amount K is obtained, then set as a lookup table value.

In this embodiment, in order to precisely compensate for the gradation of the input/output black addition amount, one-dimensional lookup table is used in step 6'. However, any mechanism that can describe the one-dimensional input/output relationship, such as a function formula, is applicable, and the number of quantifying divisions of the lookup table is not limited to 8 bits.

Setting can be made so that consistency of density of black addition amount may be obtained between input and output. Conversion characteristics can be specified so that equivalent lightness or density may be obtained, not the exactly identical lightness or density.

In step 7', by solving Neural Network 2 by using the numerical solution from the calorimetric values L*a*b* for the input address values Y, M, C and K of the 4-input 3-output DLUT color converter 248 and the black addition amount for the image output apparatus 300 that has an equivalent lightness to that of the input address value K of the 4-input 3-output DLUT color converter 248, the remaining image recording signals Y', M', C' and K' for the image output apparatus 300 that are calorimetrically identical to the L*a*b*, with black addition amount being K' are obtained. Numerical solution of Neural Network 2 uses a similar approach to that in the first embodiment.

Next, in step 8', When the input address values Y, M and C of the 4-input 3-output DLUT color converter 248 are all zero, the image recording signal Y', M', C' and K' obtained in step 7' are all corrected to be zero. In this way, black text and black thin lines specified in a single black color in an electronic manuscript can be reproduced in a single black color that has the same lightness by the image output apparatus 300. This considerably upgrades the reproducibility of black text and black thin lines.

While the image recording signals Y', M', C' and K' are all corrected to be zero in step 8' when the input address values Y, M and C of the 4-input 3-output DLUT color converter 248 are all zero in this embodiment, step 8' may be skipped when more accuracy in color consistency between input and output is desired.

In case the color characteristics of the input color signals Y, M, C and K for printing are close to those of the color signals Y, M, C and K for color printers, reproduction of black text or black thin lines in a single black color may be acceptable visually even when correction of Y', M' and C' in step 8' is skipped.

In such a case also, it is possible to skip step 8'. Note that it is preferable to perform correction of Y', M' and C' in step 8' as in this embodiment, in order to assure reproduction of black text and black thin lines in a single black color.

Finally, in step 9', by setting the image recording signals Y', M', C' and K' obtained in step 8' and the black addition amount K' obtained in step 7 to lattice points of the 4-input 3-output DLUT color converter 248, it is possible to determine the color conversion parameters of the 4-input 3-output DLUT color converter 248.

Via the configuration shown in this embodiment, it is possible to perform direct color conversion by using a 4-input 3-output four-dimensional direct lookup table and a one-dimensional lookup table without configuring the color conversion means 240 by the color conversion processing that has a number of operations, as well as the advantages shown in the first and second embodiments. This realizes a very fast color conversion at a low cost by using a very small table memory capacity. In case hardware is used to realize this embodiment, the embodiment can be realized with hardware at a low cost because of a very small table memory capacity.

As mentioned earlier, device-independent color signals in the color system color space are obtained from input color signals containing five more colors including black. An output black color signal is determined that has the lightness equivalent to the lightness of the input black color signal K. From the output black color signal and the device-independent color signals, the remaining three variable color signals are determined by solving the color conversion model for the image output apparatus 300 by using the numerical solution, so that calorimetric consistency between the remaining three variable color signals and the device-independent color signals may be obtained. When color signals other than the input black color signal are all zero, the remaining three variable color signals are corrected to be zero. In this way, both the high color consistency between input and output and favorable reproduction in a single black color of black text and black thin lines specified in a single black color in an electronic manuscript, with a consistent lightness, are realized.

According to the invention, it is possible to realizes a very fast color conversion by using the 4-or-more-input 4-output direct lookup table without configuring the color conversion means by the color conversion processing that has a number of operations. In case hardware is used to realize this embodiment, the embodiment can be realized with hardware easily because of reduced operations.

According to the invention, it is possible to realizes a very fast color conversion by using the 4-or-more-input 3-output direct lookup table without configuring the color conversion means by the color conversion processing that has a number of operations. This realizes a very fast color conversion at a low cost by using a very small table memory capacity. In case hardware is used to realize this embodiment, the embodiment can be realized with hardware at a low cost because of a very small table memory capacity.

What is claimed is:

1. A color image processing method for converting first color signals containing four or more variables including black to second color signals containing four variables including black, said method comprising the steps of:
    obtaining device-independent color signals on color system color coordinates from said first color signals,
    determining a black color signal in said second color signals having the identical or virtually identical density as the black color signal in said first color signals,
    determining the remaining three variable color signals in said second color signals from the black color signal and the device-independent color signals in said second color signals so that colorimetric consistency of the three variable color signals may be obtained,
    wherein
    when the color signals other than black in said first color signals are set to zero, the color signals other than black in said second color signals are set to zero.

2. The color image processing method according to claim 1, wherein the color signals other than black in said second color signals are not set to zero under a predetermined condition.

3. The color image processing method according to claim 1, wherein
    the color signals other than black in said first color signals and in said second color signals are yellow, magenta, and cyan.

4. The color image processing method according to claim 1, wherein
    the device-independent color signals on said color system color coordinates are L*a*b color signals.

5. The color image processing method according to claim 1, wherein
    the step for determining a black color signal in said second color signals having the identical or virtually identical density as the black color signal in said first color signals is configured by a lookup table.

6. The color image processing method according to claim 1, wherein
    a function showing the relationship between said second color signals and the device-independent color signals on color system color coordinates is obtained in advance via a step for determining the remaining three variable color signals in said second color signals from the black color signal and the device-dependent color signals in said second signals so that calorimetric consistency of the three variable color signals may be obtained, and said function is solved by using as an input the black color signal and the device-dependent color signals in said second signals, in order to determine the remaining three variable color signals in said second color signals.

7. A color image processor for converting first color signals containing four or more variables including black to second color signals containing four variables including black, said processor comprising:

means for obtaining device-independent color signals on color system color coordinates from said first color signals, means for determining a black color signal in said second color signals having the identical or virtually identical density as the black color signal in said first color signals, and means for determining the remaining three variable color signals in said second color signals from the black color signal and the device-independent color signals in said second color signals so that calorimetric consistency of the three variable color signals may be obtained, wherein the color signals other than black in said second color signals are set to zero, when the color signals other than black in said first color signals are zero.

8. The color image processor according to claim 7, wherein said color image processor comprises means for setting the color signals other than black in said second color signals to zero, in case the color signals other than black in said first color signals are zero.

9. The color image processor according to claim 7, wherein the color signals other than black in said first color signals and in said second color signals are yellow, magenta, and cyan.

10. The color image processor according to claim 7, wherein the device-independent color signals on said color system color coordinates are L*a*b color signals.

11. The color image processor according to claim 7, wherein the step for determining a black color signal in said second color signals having the identical or virtually identical density as the black color signal in said first color signals is configured by a lookup table.

12. The color image processor according to claim 7, wherein a function showing the relationship between said second color signals and the device-independent color signals on color system color coordinates is obtained in advance via means for determining the remaining three variable color signals in said second color signals from the black color signal and the device-dependent color signals in said second signals so that calorimetric consistency of the three variable color signals may be obtained, and said function is solved by using as an input the black color signal and the device-dependent color signals in said second signals, in order to determine the remaining three variable color signals in said second color signals.

13. The color image processor, wherein each means of said color image processor according to claim 7 is configured by a 4-or-more-input 4-output color converter that inputs color signals containing four or more variables in said first color signals and outputs four variable color signals in said second color signals.

14. The color image processor according to claim 13, wherein said 4-or-more-input 4-output color converter is configured by a direct lookup table.

15. The color image processor comprising:

each means of the color image processor according to claim 7 is configured by a 4-or-more-input 3-output color converter that inputs color signals containing four or more variables in said first color signals and outputs three variable color signals other than black out of the four variable color signals in said second color signals, and a 1-input 1-output color converter that inputs the black color signal in said first color signals and outputs the black color signal in said second color signals.

16. The color image processor according to claim 15, wherein said 4-or-more-input 3-output color converter is configured by a direct lookup table, and said 1-input 1-output color converter is configured by a lookup table.

* * * * *